United States Patent
Chen et al.

(10) Patent No.: US 11,032,061 B2
(45) Date of Patent: Jun. 8, 2021

(54) ENABLING CONSTANT PLAINTEXT SPACE IN BOOTSTRAPPING IN FULLY HOMOMORPHIC ENCRYPTION

(71) Applicant: Microsoft Technology Licensing, LLC, Redmond, WA (US)

(72) Inventors: Hao Chen, Redmond, WA (US); Kyoohyung Han, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 15/965,006

(22) Filed: Apr. 27, 2018

(65) Prior Publication Data

US 2019/0334694 A1 Oct. 31, 2019

(51) Int. Cl.
*H04L 29/06* (2006.01)
*H04L 9/00* (2006.01)
*H04L 9/06* (2006.01)

(52) U.S. Cl.
CPC ............ *H04L 9/008* (2013.01); *H04L 9/0631* (2013.01)

(58) Field of Classification Search
CPC ..... H04L 63/00; H04L 9/008; H04L 9/00631; H04L 2209/08; G06F 16/00; H04W 4/00
See application file for complete search history.

(56) References Cited

U.S. PATENT DOCUMENTS 5,220,606 A * 6/1993 Greenberg ............ H04L 9/3026
380/28
5,778,074 A * 7/1998 Garcken ............... H04L 9/0618
380/28

(Continued)

FOREIGN PATENT DOCUMENTS

CN  105933102 A  *  9/2016
CN  107070634 A  *  8/2017

(Continued)

OTHER PUBLICATIONS

Strickland; nt.number theory—lowest degree of polynomial that removes the first digit of an integer in base p—MathOverflow; hereinafter Teichmuller (Year: 2017).*

(Continued)

*Primary Examiner* — Joseph P Hirl
*Assistant Examiner* — Leynna Truvan
(74) *Attorney, Agent, or Firm* — Schwegman Lundberg & Woessner, P.A.

(57) ABSTRACT

Systems and methods for enabling constant plaintext space in bootstrapping in fully homomorphic encryption (FHE) are disclosed. A computer-implemented method for producing an encrypted representation of data includes accessing a set of encoded digits. The method includes applying an inverse linear transformation to the set of encoded digits to obtain a first encoded polynomial. The method includes applying a modulus switching and dot product with bootstrapping key to add an error term to each of the encoded digits in the first polynomial to obtain a second encoded polynomial. The method includes applying a linear transformation to the second encoded polynomial to obtain a first batch encryption. The method includes applying digit extraction to the first batch encryption to obtain a second batch encryption, the second batch encryption corresponding to the set of encoded digits without the error term.

20 Claims, 4 Drawing Sheets

(56) References Cited

U.S. PATENT DOCUMENTS

| | | | | |
|---|---|---|---|---|
| 5,809,140 A * | 9/1998 | Rubin | H04L 9/0827 | 380/279 |
| 6,157,611 A * | 12/2000 | Shanbhag | H04J 13/12 | 370/208 |
| 6,185,304 B1 * | 2/2001 | Coppersmith | H04L 9/002 | 380/259 |
| 6,185,679 B1 * | 2/2001 | Coppersmith | H04L 9/002 | 380/37 |
| 6,189,095 B1 * | 2/2001 | Coppersmith | H04L 9/002 | 380/37 |
| 6,192,129 B1 * | 2/2001 | Coppersmith | H04L 9/0625 | 380/259 |
| 6,240,143 B1 * | 5/2001 | Shanbhag | H04J 13/004 | 375/295 |
| 6,243,470 B1 * | 6/2001 | Coppersmith | H04L 9/0625 | 380/259 |
| 6,314,125 B1 * | 11/2001 | Shanbhag | H04J 13/0025 | 370/208 |
| 6,317,834 B1 * | 11/2001 | Gennaro | G06F 21/32 | 380/286 |
| 6,327,303 B1 * | 12/2001 | Balogh | H04B 1/66 | 375/240 |
| 6,421,806 B1 * | 7/2002 | Piret | H04L 1/0043 | 714/777 |
| 6,578,061 B1 * | 6/2003 | Aoki | G06F 7/721 | 380/28 |
| 6,578,144 B1 * | 6/2003 | Gennaro | H04L 9/302 | 380/30 |
| 6,671,251 B1 * | 12/2003 | Kim | H04J 13/0048 | 370/209 |
| 6,674,712 B1 * | 1/2004 | Yang | H04J 13/004 | 370/208 |
| 6,694,431 B1 * | 2/2004 | Binding | H04L 63/0428 | 713/152 |
| 6,697,488 B1 * | 2/2004 | Cramer | H04L 9/3013 | 380/28 |
| 6,721,349 B1 * | 4/2004 | Willenegger | H04B 1/707 | 375/130 |
| 6,751,731 B1 * | 6/2004 | Binding | H04L 63/0869 | 709/203 |
| 6,775,772 B1 * | 8/2004 | Binding | H04L 63/0428 | 380/279 |
| 7,039,946 B1 * | 5/2006 | Binding | H04L 63/0823 | 380/259 |
| 8,102,997 B2 * | 1/2012 | Teglia | H04L 9/003 | 380/29 |
| 8,316,237 B1 * | 11/2012 | Felsher | H04L 9/0825 | 380/282 |
| 8,515,058 B1 * | 8/2013 | Gentry | H04L 9/008 | 380/28 |
| 8,527,765 B2 * | 9/2013 | Veugen | H04L 9/3236 | 380/278 |
| 8,626,812 B2 * | 1/2014 | Yang | G06F 7/724 | 708/492 |
| 8,862,879 B2 * | 10/2014 | Lerner | H04L 9/002 | 713/153 |
| 8,909,967 B1 * | 12/2014 | van Dijk | G06F 12/1408 | 713/330 |
| 9,037,895 B2 * | 5/2015 | Sethumadhavan | G06F 21/76 | 713/502 |
| 9,137,492 B2 * | 9/2015 | Lima | H04L 1/1812 | |
| 9,288,039 B1 * | 3/2016 | Monet | H04L 9/008 | |
| 9,436,835 B1 * | 9/2016 | Saldamli | G06F 21/602 | |
| 9,634,978 B2 * | 4/2017 | Jandhyala | H04L 51/32 | |
| 9,639,671 B2 * | 5/2017 | Torrey | G06F 21/12 | |
| 9,742,556 B2 * | 8/2017 | Bacon | H04L 9/008 | |
| 9,742,739 B2 * | 8/2017 | Dolev | H04L 9/008 | |
| 9,787,647 B2 * | 10/2017 | Wu | H04L 63/0428 | |
| 9,942,040 B1 * | 4/2018 | Kalach | H04L 9/0852 | |
| 10,075,288 B2 * | 9/2018 | Khedr | H04L 9/008 | |
| 10,095,880 B2 * | 10/2018 | Bent | G06F 21/6227 | |
| 10,097,351 B1 * | 10/2018 | Kelly | H04L 9/3093 | |
| 10,116,437 B1 * | 10/2018 | Krendelev | H04L 9/008 | |
| 10,289,816 B1 * | 5/2019 | Malassenet | G06F 9/30036 | |
| 10,333,695 B2 * | 6/2019 | Laine | G06F 21/602 | |
| 10,333,696 B2 * | 6/2019 | Ahmed | H04L 9/006 | |
| 10,333,698 B2 * | 6/2019 | Shamee | H04L 9/008 | |
| 10,333,715 B2 * | 6/2019 | Chu | H04L 9/3247 | |
| 10,341,086 B2 * | 7/2019 | Gajek | H04L 9/14 | |
| 10,360,390 B2 * | 7/2019 | Tueno | G06F 21/602 | |
| 10,382,194 B1 * | 8/2019 | Miller | H04L 9/008 | |
| 10,404,668 B2 * | 9/2019 | Tissot | G06F 21/602 | |
| 10,409,615 B2 * | 9/2019 | Chen | G06F 9/3897 | |
| 10,419,027 B2 * | 9/2019 | Richardson | H03M 13/112 | |
| 10,423,647 B2 * | 9/2019 | Llagostera | G06N 7/005 | |
| 10,423,806 B2 * | 9/2019 | Cerezo Sanchez | G06F 17/2705 | |
| 10,476,661 B2 * | 11/2019 | Mandal | H04L 9/0894 | |
| 10,509,694 B2 * | 12/2019 | Sivalingam | G06F 11/0706 | |
| 10,530,574 B2 * | 1/2020 | Shi | H04L 9/0861 | |
| 2001/0012361 A1 * | 8/2001 | Kasahara | H04L 9/002 | 380/30 |
| 2001/0025351 A1 * | 9/2001 | Kursawe | G06F 11/182 | 714/4.1 |
| 2001/0039630 A1 * | 11/2001 | Kursawe | G06F 11/182 | 714/4.1 |
| 2002/0049601 A1 * | 4/2002 | Asokan | G06Q 30/06 | 705/80 |
| 2002/0129087 A1 * | 9/2002 | Cachin | H04L 12/1877 | 709/200 |
| 2003/0059044 A1 * | 3/2003 | Shimizu | H04L 9/0631 | 380/37 |
| 2003/0105791 A1 * | 6/2003 | Stein | G06F 7/724 | 708/492 |
| 2003/0112969 A1 * | 6/2003 | Algesheimer | G06F 7/72 | 380/28 |
| 2003/0152219 A1 * | 8/2003 | Coppersmith | H04L 9/0668 | 380/37 |
| 2003/0185454 A1 * | 10/2003 | Simard | H04N 19/122 | 382/240 |
| 2003/0202697 A1 * | 10/2003 | Simard | G06K 9/00456 | 382/195 |
| 2004/0078409 A1 * | 4/2004 | Stein | G06F 7/724 | 708/492 |
| 2004/0114484 A1 * | 6/2004 | Sako | G11B 20/00086 | 369/53.22 |
| 2004/0120520 A1 * | 6/2004 | Harley | G06F 7/725 | 380/30 |
| 2004/0223655 A1 * | 11/2004 | Liao | G06F 17/148 | 382/240 |
| 2005/0249425 A1 * | 11/2005 | Paniconi | H04N 19/172 | 382/240 |
| 2006/0123325 A1 * | 6/2006 | Wilson | G06F 7/724 | 714/781 |
| 2006/0228031 A1 * | 10/2006 | Hou | H04N 19/63 | 382/232 |
| 2006/0228032 A1 * | 10/2006 | Hou | H04N 19/635 | 382/240 |
| 2006/0230090 A1 * | 10/2006 | Hou | G06F 17/148 | 708/400 |
| 2006/0253709 A1 * | 11/2006 | Cheng | G06F 21/577 | 713/182 |
| 2007/0162976 A1 * | 7/2007 | Anderson | G06F 21/577 | 726/25 |
| 2007/0237324 A1 * | 10/2007 | Ferguson | G06F 9/30029 | 380/28 |
| 2007/0286415 A1 * | 12/2007 | Bertoni | H04L 9/0631 | 380/37 |
| 2007/0286416 A1 * | 12/2007 | Bertoni | H04L 9/0631 | 380/37 |
| 2008/0049939 A1 * | 2/2008 | Canetti | H04L 9/0894 | 380/277 |
| 2008/0063209 A1 * | 3/2008 | Jaquette | G06F 21/80 | 380/284 |
| 2008/0077797 A1 * | 3/2008 | Greco | H04L 9/3247 | 713/176 |
| 2008/0170700 A1 * | 7/2008 | Darba | G06F 21/10 | 380/278 |

(56) References Cited

U.S. PATENT DOCUMENTS

| | | | | |
|---|---|---|---|---|
| 2008/0240423 | A1* | 10/2008 | Gueron | G06F 7/724 380/28 |
| 2008/0240426 | A1* | 10/2008 | Gueron | G06F 3/0689 380/44 |
| 2008/0253570 | A1* | 10/2008 | Greco | G11B 20/00086 380/277 |
| 2008/0273696 | A1* | 11/2008 | Greco | G06F 21/80 380/44 |
| 2008/0273697 | A1* | 11/2008 | Greco | G11B 20/00086 380/44 |
| 2009/0031142 | A1* | 1/2009 | Halevi | G06F 12/1408 713/190 |
| 2009/0044080 | A1* | 2/2009 | Michaels | G06F 7/725 714/780 |
| 2009/0225986 | A1* | 9/2009 | Gennaro | H04L 9/0836 380/278 |
| 2009/0279688 | A1* | 11/2009 | Michaels | H04L 9/0668 380/28 |
| 2010/0057823 | A1* | 3/2010 | Filseth | H04L 9/0631 708/492 |
| 2010/0104095 | A1* | 4/2010 | Halevi | H04L 9/002 380/29 |
| 2010/0115286 | A1* | 5/2010 | Hawkes | G06F 12/1408 713/189 |
| 2010/0306299 | A1* | 12/2010 | Reidenbach | G06F 7/726 708/492 |
| 2010/0322411 | A1* | 12/2010 | Lubberhuizen | H04L 9/0631 380/28 |
| 2011/0010720 | A1* | 1/2011 | Smith | G06F 21/00 718/102 |
| 2011/0010770 | A1* | 1/2011 | Smith | G06F 21/71 726/18 |
| 2011/0060901 | A1* | 3/2011 | Troncoso Pastoriza | H04L 9/008 713/150 |
| 2011/0060917 | A1* | 3/2011 | Troncoso Pastoriza | G06F 21/6245 713/189 |
| 2011/0060918 | A1* | 3/2011 | Troncoso Pastoriza | G06F 21/72 713/189 |
| 2011/0063093 | A1* | 3/2011 | Fung | G06Q 10/06 340/10.52 |
| 2011/0110525 | A1* | 5/2011 | Gentry | H04L 9/0822 380/285 |
| 2011/0222687 | A1* | 9/2011 | Mori | H04N 7/1675 380/200 |
| 2011/0243320 | A1* | 10/2011 | Halevi | H04L 9/008 380/30 |
| 2012/0023577 | A1* | 1/2012 | Stephens, Jr. | H04L 67/10 726/22 |
| 2012/0033804 | A1* | 2/2012 | Soquet | H04L 9/12 380/28 |
| 2012/0039463 | A1* | 2/2012 | Gentry | H04L 9/008 380/28 |
| 2012/0102334 | A1* | 4/2012 | O'Loughlin | G06F 21/57 713/189 |
| 2012/0170739 | A1* | 7/2012 | Karroumi | H04L 9/0631 380/28 |
| 2012/0213359 | A1* | 8/2012 | Troncoso Pastoriza | H04L 9/008 380/28 |
| 2012/0237035 | A1* | 9/2012 | Kawabata | H04L 9/0631 380/277 |
| 2013/0086390 | A1* | 4/2013 | Kennedy | G06F 21/62 713/189 |
| 2013/0097431 | A1* | 4/2013 | Hriljac | G06F 21/125 713/189 |
| 2013/0148868 | A1* | 6/2013 | Troncoso Pastoriza | G06K 9/00288 382/118 |
| 2013/0170640 | A1* | 7/2013 | Gentry | H04L 9/008 380/30 |
| 2013/0216044 | A1* | 8/2013 | Gentry | H04L 9/008 380/277 |
| 2013/0329883 | A1* | 12/2013 | Tamayo-Rios | H04L 9/008 380/28 |
| 2014/0053000 | A1* | 2/2014 | Yap | H04L 9/0643 713/189 |
| 2014/0177828 | A1* | 6/2014 | Loftus | H04L 9/008 380/44 |
| 2014/0205084 | A1* | 7/2014 | Wolrich | H04L 9/3239 380/28 |
| 2014/0233731 | A1* | 8/2014 | Naccache | H04L 9/008 380/44 |
| 2014/0248929 | A1* | 9/2014 | Noonan | H04L 9/001 463/9 |
| 2014/0289004 | A1* | 9/2014 | Monforte | G06Q 30/0202 705/7.31 |
| 2014/0304521 | A1* | 10/2014 | Graf | G06F 21/602 713/189 |
| 2015/0067302 | A1* | 3/2015 | Gueron | G06F 7/00 712/210 |
| 2015/0067874 | A1* | 3/2015 | Johnson | G06F 21/14 726/26 |
| 2015/0195083 | A1* | 7/2015 | Jacquin | H04L 9/008 380/28 |
| 2015/0249649 | A1* | 9/2015 | Rohloff | H04L 9/3093 713/153 |
| 2015/0312028 | A1* | 10/2015 | Cheon | H04L 9/008 713/189 |
| 2015/0312031 | A1* | 10/2015 | Seo | H04L 9/008 380/28 |
| 2016/0105402 | A1* | 4/2016 | Soon-Shiong | H04L 63/0428 713/164 |
| 2016/0156460 | A1* | 6/2016 | Feng | H04L 9/008 713/168 |
| 2016/0197726 | A1* | 7/2016 | Yasuda | H04L 9/14 380/28 |
| 2016/0254912 | A1* | 9/2016 | Maniatakos | H04L 9/321 713/168 |
| 2016/0299743 | A1* | 10/2016 | Fenney | G06F 7/722 |
| 2016/0330017 | A1* | 11/2016 | Youn | H04L 9/304 |
| 2016/0337319 | A1* | 11/2016 | Vaya | H04L 63/0428 |
| 2016/0342869 | A1* | 11/2016 | Miyata | G06K 15/408 |
| 2016/0344557 | A1* | 11/2016 | Chabanne | H04L 9/3066 |
| 2017/0063522 | A1* | 3/2017 | Bruneau | H04L 9/003 |
| 2017/0063523 | A1* | 3/2017 | Bruneau | G09C 1/00 |
| 2017/0063524 | A1* | 3/2017 | Bruneau | H04L 9/0631 |
| 2017/0063526 | A1* | 3/2017 | Kahrobaei | H04L 9/008 |
| 2017/0116396 | A1* | 4/2017 | Gu | G06F 21/125 |
| 2017/0141798 | A1* | 5/2017 | Kudekar | H03M 13/6527 |
| 2017/0141918 | A1* | 5/2017 | Dubrova | H04L 9/14 |
| 2017/0147835 | A1* | 5/2017 | Bacon | G06F 21/602 |
| 2017/0149557 | A1* | 5/2017 | Bacon | H04L 9/008 |
| 2017/0155628 | A1* | 6/2017 | Rohloff | H04L 9/30 |
| 2017/0169220 | A1* | 6/2017 | Fish | H03K 19/17768 |
| 2017/0180115 | A1* | 6/2017 | Laine | H04L 9/008 |
| 2017/0244553 | A1* | 8/2017 | Savry | H04L 9/008 |
| 2017/0244564 | A1* | 8/2017 | Naslund | H04L 9/0061 |
| 2017/0250819 | A1* | 8/2017 | Hoffstein | H04L 9/3247 |
| 2017/0331494 | A1* | 11/2017 | Richardson | H03M 13/1102 |
| 2017/0331497 | A1* | 11/2017 | Richardson | H03M 13/6362 |
| 2017/0357749 | A1* | 12/2017 | Laine | G06F 21/6245 |
| 2017/0359086 | A1* | 12/2017 | Kudekar | H04L 1/0058 |
| 2017/0366338 | A1* | 12/2017 | Gajek | H04L 9/008 |
| 2018/0048459 | A1* | 2/2018 | Ding | H04L 9/008 |
| 2018/0069706 | A1* | 3/2018 | Dubrova | G06F 11/1004 |
| 2018/0096248 | A1* | 4/2018 | Chabanne | H04L 9/008 |
| 2018/0109269 | A1* | 4/2018 | Richardson | H03M 13/1128 |
| 2018/0123614 | A1* | 5/2018 | Loncke | H03M 13/1108 |
| 2018/0123615 | A1* | 5/2018 | Varatkar | H03M 13/1125 |
| 2018/0123734 | A1* | 5/2018 | Loncke | G06F 11/002 |
| 2018/0131391 | A1* | 5/2018 | Kudekar | H03M 13/1125 |
| 2018/0131512 | A1* | 5/2018 | Gajek | H04L 9/008 |
| 2018/0173789 | A1* | 6/2018 | Llagostera | G06F 16/353 |
| 2018/0183570 | A1* | 6/2018 | Zheng | G09C 1/00 |
| 2018/0198601 | A1* | 7/2018 | Laine | H04L 9/008 |

(56) References Cited

U.S. PATENT DOCUMENTS

| | | | | |
|---|---|---|---|---|
| 2018/0212750 | A1* | 7/2018 | Hoffstein | G06F 17/16 |
| 2018/0248683 | A1* | 8/2018 | Diallo | H04L 9/008 |
| 2018/0276014 | A1* | 9/2018 | Kliuchnikov | G06N 10/00 |
| 2018/0276417 | A1* | 9/2018 | Cerezo Sanchez | G06F 8/41 |
| 2018/0294950 | A1* | 10/2018 | Khedr | H04L 9/0618 |
| 2018/0294951 | A1* | 10/2018 | Paz de Araujo | H04L 9/008 |
| 2018/0337899 | A1* | 11/2018 | Becker | H04L 9/0825 |
| 2018/0359078 | A1* | 12/2018 | Jain | G06F 21/602 |
| 2018/0359084 | A1* | 12/2018 | Jain | H04L 9/08 |
| 2018/0367293 | A1* | 12/2018 | Chen | H04L 9/14 |
| 2018/0373834 | A1* | 12/2018 | Cho | G16B 50/30 |
| 2018/0375639 | A1* | 12/2018 | Lauter | H04L 9/088 |
| 2018/0375640 | A1* | 12/2018 | Laine | H04L 9/008 |
| 2018/0375838 | A1* | 12/2018 | Hersans | H04L 63/0435 |
| 2019/0007196 | A1* | 1/2019 | Malluhi | H04L 63/0428 |
| 2019/0007197 | A1* | 1/2019 | Laine | H04L 9/3093 |
| 2019/0013900 | A1* | 1/2019 | Patel | H04L 1/0009 |
| 2019/0044719 | A1* | 2/2019 | Poeppelmann | H04L 9/004 |
| 2019/0044720 | A1* | 2/2019 | Poeppelmann | H04L 9/3093 |
| 2019/0087689 | A1* | 3/2019 | Chen | G06K 9/6256 |
| 2019/0140818 | A1* | 5/2019 | Bent | G06F 21/602 |
| 2019/0166030 | A1* | 5/2019 | Chen | H04L 7/042 |
| 2019/0171833 | A1* | 6/2019 | Zhang | G06F 21/6218 |
| 2019/0178980 | A1* | 6/2019 | Zhang | A61B 5/7257 |
| 2019/0245679 | A1* | 8/2019 | Suresh | G09C 1/00 |
| 2019/0268170 | A1* | 8/2019 | Plusquellic | G09C 1/00 |
| 2019/0319636 | A1* | 10/2019 | Stainbrook | H03M 13/616 |
| 2019/0334695 | A1* | 10/2019 | Veeningen | H04L 9/3218 |
| 2019/0370159 | A1* | 12/2019 | Smith | G06F 21/57 |
| 2019/0372753 | A1* | 12/2019 | Dorrendorf | G06F 7/724 |
| 2019/0372754 | A1* | 12/2019 | Gou | G06F 17/153 |

FOREIGN PATENT DOCUMENTS

| | | | | | |
|---|---|---|---|---|---|
| DE | 102015208142 | A1 * | 11/2015 | | H04L 9/008 |
| EP | 3166251 | A1 * | 5/2017 | | H04L 63/0428 |
| EP | 3244567 | A1 * | 11/2017 | | H04L 9/0656 |
| EP | 3493456 | A1 * | 6/2019 | | H04L 9/008 |
| WO | WO-2004036414 | A2 * | 4/2004 | | H04L 9/0662 |
| WO | WO-2008028766 | A1 * | 3/2008 | | G06F 21/80 |
| WO | WO-2008132197 | A1 * | 11/2008 | | G11B 20/00224 |
| WO | WO-2017064085 | A1 * | 4/2017 | | H04L 9/008 |
| WO | WO-2017079226 | A1 * | 5/2017 | | H04L 9/008 |
| WO | WO-2017079237 | A1 * | 5/2017 | | H04L 9/3073 |
| WO | WO-2018084691 | A2 * | 5/2018 | | H04L 9/008 |
| WO | WO-2018124869 | A1 * | 7/2018 | | H04L 9/008 |
| WO | WO-2019094303 | A1 * | 5/2019 | | H04L 9/0894 |

OTHER PUBLICATIONS

Chen, et al., "Homomorphic Lower Digits Removal and Improved FHE Bootstrapping", In Proceedings of Annual International Conference on the Theory and Applications of Cryptographic Techniques; Apr. 29, 2018, pp. 315-337.

Halevi, et al., "Bootstrapping for HElib", In Proceedings of Annual International conference on the theory and applications of cryptographic techniques, Apr. 26, 2015, pp. 641-670.

"International Search Report and Written Opinion Issued in PCT Application No. PCT/US19/27303", dated Jul. 8, 2019, 11 pages.

* cited by examiner

ENABLING CONSTANT PLAINTEXT SPACE IN BOOTSTRAPPING IN FULLY HOMOMORPHIC ENCRYPTION

BACKGROUND

Fully homomorphic encryption (FHE) is a form of encryption that allows computation on ciphertexts, generating an encrypted result which, when decrypted, matches the result of the operations as if they had been performed on the plaintext. A ciphertext may include a combination of a signal (corresponding to a function of a plaintext value) and a noise. In FHE, bootstrapping reduces the noise in the ciphertexts, so that computations can be performed on the ciphertexts without decryption of the ciphertexts. Techniques for bootstrapping in FHE may be desirable.

BRIEF DESCRIPTION OF THE DRAWINGS

Some embodiments of the technology are illustrated, by way of example and not limitation, in the figures of the accompanying drawings.

SUMMARY

Figure 1:
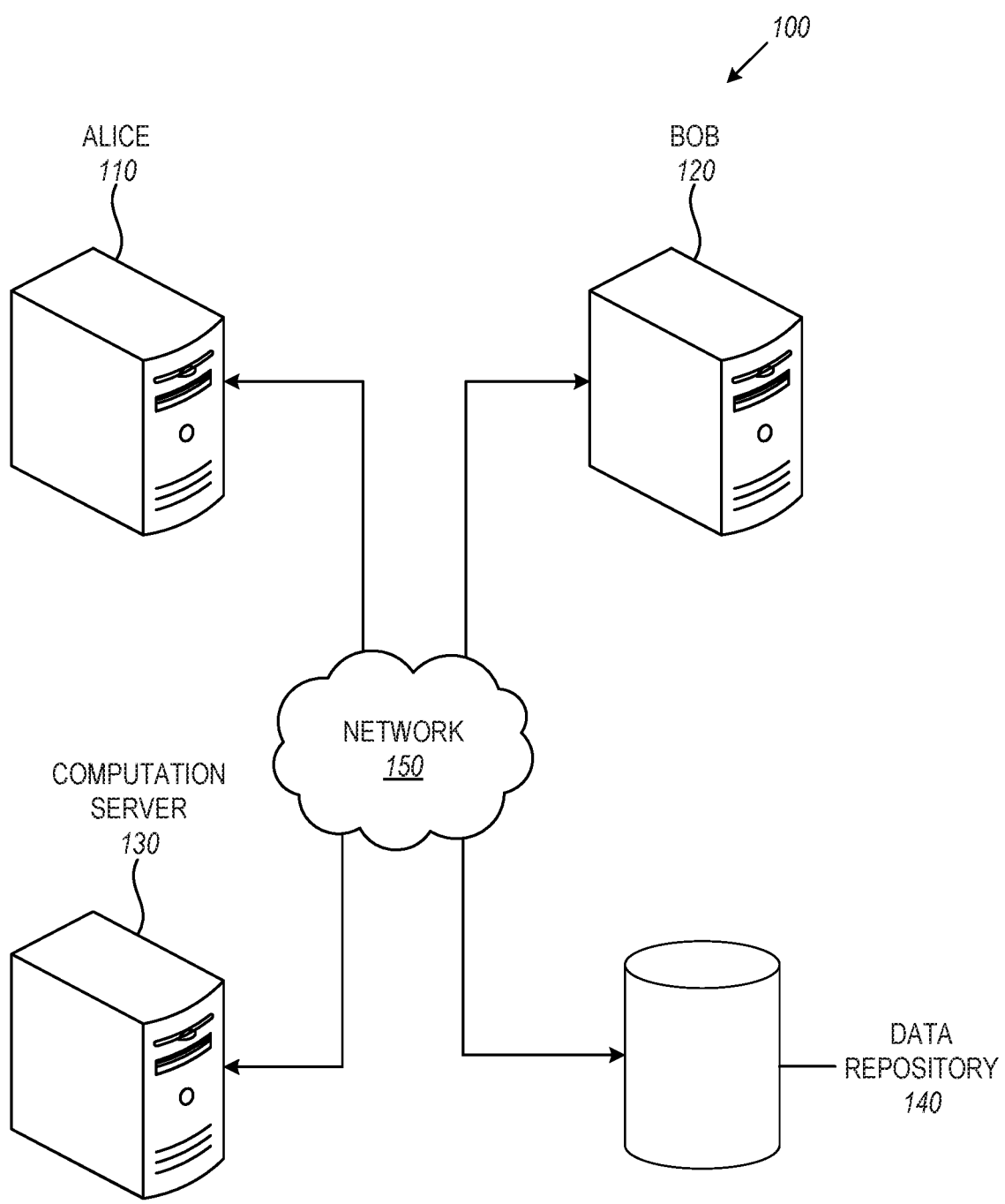
FIG. 1 illustrates an example system in which enabling constant plaintext space in bootstrapping in fully homomorphic encryption (FHE) may be implemented, in accordance with some embodiments.

The present disclosure generally relates to machines configured to provide enabling constant plaintext space in bootstrapping in fully homomorphic encryption (FHE), including computerized variants of such special-purpose machines and improvements to such variants, and to the technologies by which such special-purpose machines become improved compared to other special-purpose machines that provide technology for FHE. In particular, the present disclosure addresses systems and methods for bootstrapping in FHE.

According to some aspects of the technology described herein, a method includes accessing a set of encoded digits, the set of encoded digits including a first number of digits. The method includes applying an inverse linear transformation to the set of encoded digits to obtain a first encoded polynomial, the first encoded polynomial including only terms where a variable x is raised to powers of zero or multiples of a second number, the second number being an integer greater than or equal to two. The method includes applying a modulus switching and dot product with bootstrapping key to add an error term to each of the encoded digits in the first polynomial to obtain a second encoded polynomial. The method includes applying a linear transformation to the second encoded polynomial to obtain a first batch encryption. The method includes applying digit extraction to the first batch encryption to obtain a second batch encryption, the second batch encryption corresponding to the set of encoded digits without the error term.

According to some aspects of the technology described herein, a system includes processing hardware and a memory. The memory stores instructions which, when executed by the processing hardware, cause the processing hardware to perform operations. The operations include accessing a set of encoded digits, the set of encoded digits including a first number of digits. The operations include applying an inverse linear transformation to the set of encoded digits to obtain a first encoded polynomial, the first encoded polynomial including only terms where a variable x is raised to powers of zero or multiples of a second number, the second number being an integer greater than or equal to two. The operations include applying a modulus switching and dot product with bootstrapping key to add an error term to each of the encoded digits in the first polynomial to obtain a second encoded polynomial. The operations include applying a linear transformation to the second encoded polynomial to obtain a first batch encryption. The operations include applying digit extraction to the first batch encryption to obtain a second batch encryption, the second batch encryption corresponding to the set of encoded digits without the error term.

According to some aspects of the technology described herein, a machine-readable medium stores instructions which, when executed by one or more machines, cause the one or more machines to perform operations. The operations include accessing a set of encoded digits, the set of encoded digits including a first number of digits. The operations include applying an inverse linear transformation to the set of encoded digits to obtain a first encoded polynomial, the first encoded polynomial including only terms where a variable x is raised to powers of zero or multiples of a second number, the second number being an integer greater than or equal to two. The operations include applying a modulus switching and dot product with bootstrapping key to add an error term to each of the encoded digits in the first polynomial to obtain a second encoded polynomial. The operations include applying a linear transformation to the second encoded polynomial to obtain a first batch encryption. The operations include applying digit extraction to the first batch encryption to obtain a second batch encryption, the second batch encryption corresponding to the set of encoded digits without the error term.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As set forth above, fully homomorphic encryption (FHE) is a form of encryption that allows computation on ciphertexts, generating an encrypted result which, when decrypted, matches the result of the operations as if they had been performed on the plaintext. A ciphertext may include a combination of a signal (corresponding to a function of a plaintext value) and a noise. FHE is advantageous because it allows an untrusted party to compute functions on secret data without learning the secret data. In this connection, two parties can have a secure communication and can have mathematical functions, based on the communication, computed by an untrusted mathematics server. In FHE, bootstrapping reduces the noise in the ciphertexts, so that computations can be performed on the ciphertexts without decryption of the ciphertexts. Techniques for bootstrapping in FHE may be desirable.

FIG. 1 illustrates an example system 100 in which enabling constant plaintext space in bootstrapping in FHE may be implemented, in accordance with some embodiments. As shown, in the system 100, two machines—Alice 110 and Bob 120—communicate over the network 150 using a FHE technique. In some cases, encrypted messages transmitted between Alice 110 and Bob 120 may be stored in the data repository 140. Mathematical computations based on the encrypted messages may be made at the computation server 130. However, the computation server 130 may lack the key(s) to decrypt the messages. Alice 110 or Bob 120 may be able to decrypt the result of the computations to obtain the result of the plaintext computations on the pre-encryption values. For example, if Alice 110 or Bob 120 provides the computation server 130 with the values Enc(a) and Enc(b), the computation server 130 may compute Enc(a)+Enc(b). Alice 110 or Bob 120 are able to decrypt Enc(a)+Enc(b) to obtain a+b, without locally computing the value of a+b. Enc refers to a FHE function.

Figure 4:
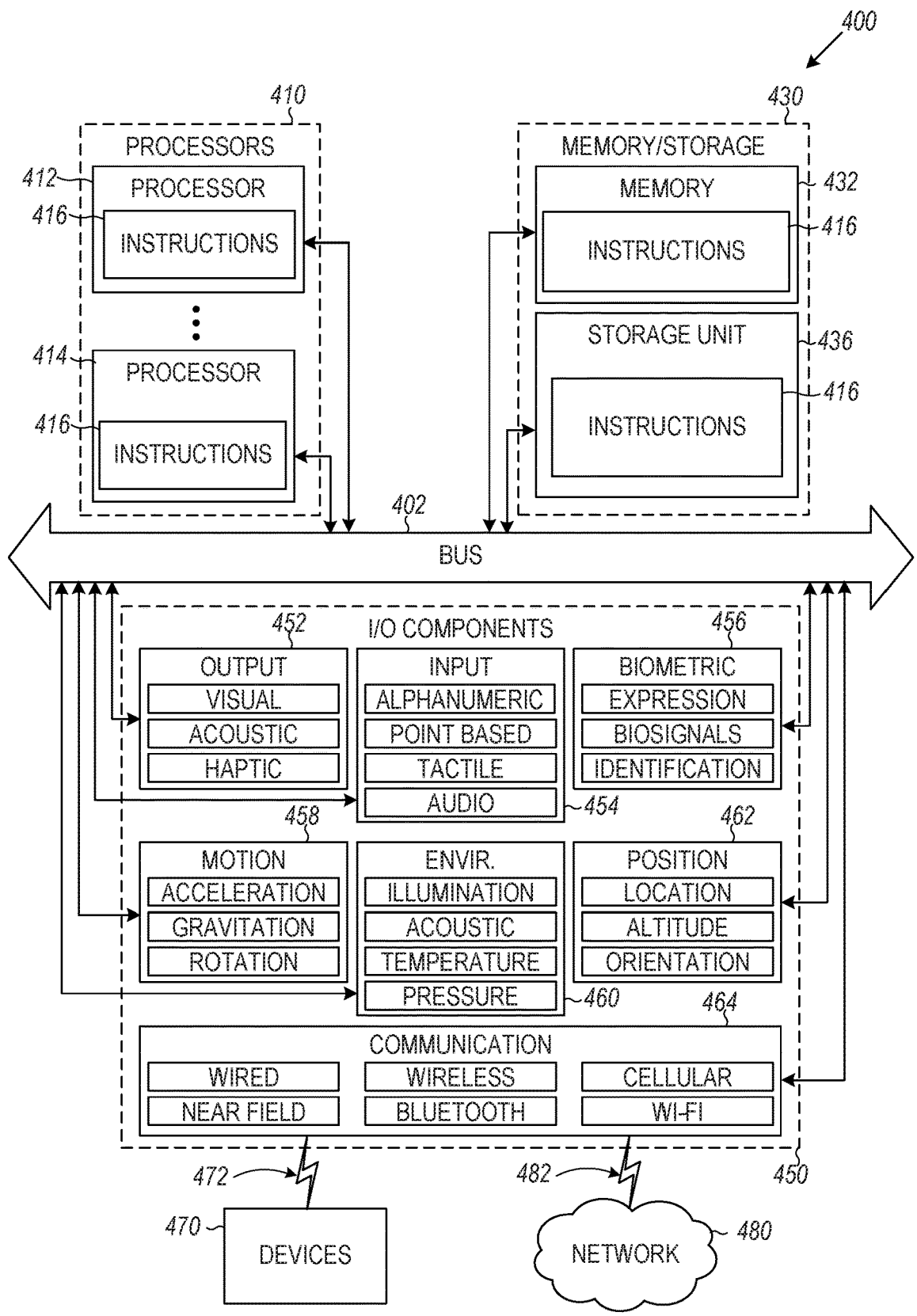
FIG. 4 is a block diagram illustrating components of a machine able to read instructions from a machine-readable medium and perform any of the methodologies discussed herein, in accordance with some embodiments.

Each of the machines 110, 120, 130, and 140 may correspond to one or more computers, for example, as shown in FIG. 4. However, the data repository 140 may be a storage device that either has or lacks a processor. The network 150 may include, without limitation, one or more of the Internet, an intranet, a local area network, a wide area network, a wired network, a wireless network, and the like.

Multiple use cases of the FHE technology described herein are possible. For example, Alice 110 and Bob 120 may be involved in blockchain transactions, anonymous digital currencies, or other financial transactions. In some cases, the computation server 130 or the data repository 140 may be use for calculating the tax, the currency exchange rate or price, or the shipping price for a transaction between Alice 110 and Bob 120 without being given access to the unencrypted private data of Alice 110 or Bob 120. In other use cases, FHE may be used in a secure voting system, in a collision-resistant hash function, or in a private information retrieval scheme.

Some bootstrapping methods support plaintext spaces that are vectors of elements in some finite ring extension of integers modulo some prime power. However, for practical applications, such as performing computation over encrypted fixed-point numbers, one usually could not fully utilize this plaintext space. Instead, it would be best if one could operate just on the constant part (integers modulo the same prime power) of that finite ring. One goal of the technology described herein is to provide techniques for operating just on the constant part of the finite ring. Some aspects of the technology described herein apply a family of "lowest digit removal" polynomials to improve homomorphic digit extraction algorithm which is a part of some bootstrapping schemes.

As discussed above, FHE allows an untrusted party to evaluate arbitrary mathematical functions (e.g., to compute a sales tax or a currency conversion) on encrypted data, without knowing the secret key or decrypting the data. In some FHE schemes, each ciphertext is associated with a certain amount of "noise," and the noise grows as homomorphic evaluations are performed. (For example, if an addition is performed, the noise terms are added, and the sum could have a larger range of noise terms.) When the noise is too large, decryption may fail to give the correct result. Therefore, if no bootstrapping is performed, one set of homomorphic encryption (HE) parameters can only evaluate circuits of a bounded depth. This approach is called leveled homomomorphic encryption (LHE).

If FHE is used, the noise may be refreshed. In some cases, bootstrapping a ciphertext in some given scheme may include running its own decryption algorithm homomorphically, using an encryption of the secret key.

Bootstrapping is a very expensive operation. First, the decryption circuits of a FHE scheme can be complex. Moreover, the decryption circuit of a FHE scheme may not be conveniently supported by the scheme itself. Hence, in order to perform bootstrapping, one may either make significant optimizations in order to bring down its cost, or design some scheme who can handle its decryption circuit more comfortably. Some FHE schemes include the scheme of Brakerski, Gentry and Vaikuntanathan (BGV) and the scheme of Fan-Vercauteran (FV).

Both BGV and FV schemes are initialized with integer parameters m, t and q. Here m is the cyclotomic field index, t is the plaintext modulus, and q is the coefficient modulus. Note that in BGV, (t, q)=1.

Let $\phi_m(x)$ denote the m-th cyclotomic polynomial and let $n=\varphi(m)$ be the degree of $\phi_m(x)$. Some aspects use the following common notations $R=\mathbb{Z}[x]/(\phi_m(x))$, $R_t=R/tR$, and $R_q=R/qR$. In both schemes, the secret key s is an element of $R_q$. It is usually ternary (i.e., each coefficient is either −1, 0 or 1) and often sparse (i.e., the number of nonzero coefficients of s are bounded by some h<<n). A ciphertext is a pair $(c_0, c_1)$ of elements in $R_q$.

The description formula is described here. The decryption of both schemes starts with a dot-product with the extended secret-key (1, s). In BGV, some implementations have $c_0+c_1 s=m+tv+\alpha q$, and decryption returns $m=((c_0+c_1 s) \bmod q) \bmod t$. In FV, the equation is $c_0+c_1 s=\Delta m+v+\alpha q$, and the decryption formula is $$m = \left\lfloor \frac{(c_0 + c_1 s) \bmod q}{\Delta} \right\rceil.$$

The native plaintext space in both schemes is $R_t$, which consists of polynomials with degree less than n and integer coefficients between 0 and t−1. Additions and multiplications of these polynomials are performed modulo both $\phi_m(x)$ and t.

Some plaintext-batching techniques may turn the plaintext space into a vector over certain finite rings. Since batching is used extensively in the bootstrapping algorithm, the details are summarized here. Suppose $t=p^r$ is a prime power, and assume p and m are coprime. Then $\phi_m(x) \bmod p^r$ factors into a product of k irreducible polynomials of degree d. Moreover, d is equal to the order of p in $\mathbb{Z}_m^*$, and k s equal to the size of the quotient group $\mathbb{Z}_m^*/\langle p \rangle$. For convenience, some implementations fix a set $S=\{s_1, \ldots, s_k\}$ of integer representatives of the quotient group. Let f be one of the irreducible factors of $\phi m(x) \bmod p^r$, and consider the finite extension ring $E=\mathbb{Z}_{p^r}[x]/(f(x))$.

Then all primitive m-th roots of unity exist in E. Fix $\zeta \in E$ to be one such root. Then a ring isomorphism results:

$$R_t \to E^K$$

$$m(x) \mapsto (m(\zeta^{s_1}), m(\zeta^{s_2}), \ldots, m(\zeta^{s_k}))$$

Using this isomorphism, the plaintexts may correspond to vectors over E, and additions/multiplications between the plaintexts are executed coefficient-wise on the components of the vectors, which are often called slots.

Below, the above two ways of viewing the plaintexts are used. They are distinguished by writing them as polynomials (no batching) and vectors (batching). For example, Enc(m (x)) means an encryption of $m(x) \in R_t$, whereas Enc $((m_1, \ldots, m_k))$ means a batch encryption of a vector $(m_1, \ldots, m_k) \in E^k$.

Modulus switching is a technique which scales a ciphertext $(c_0, c_1)$ with modulus q to another one $(c_0', c_1')$ with modulus q' that decrypts to the same message. In BGV, modulus switching is a necessary technique to reduce the noise growth. Modulus switching is sometimes not necessary for FV. However, it may be useful in the bootstrapping procedure disclosed herein. More precisely, modulus switching in BGV may use q and q' to be both coprime to t. For simplicity, suppose q≡q'≡1 (mod t). Then $c_i'$=the closest integer polynomial to $$\frac{q'}{q} c$$

such that $c_i' \equiv c_i$ mod t. For FV, q and q' might not be coprime to t, and modulus switching simply does scaling and rounding to integers, i.e., $c_i' = \lfloor q'/q c_i \rceil$.

In some cases, modulus switching slightly increases the noise-to-modulus ratio due to rounding errors in the process. Therefore, one cannot switch to an arbitrarily small modulus q' may be used. Rule 1 puts a lower bound on the size of q' for FV (the case for BGV is similar).

---

Rule 1 Suppose $c_0 + c_1 s = \Delta m + v + aq$ is a ciphertext in FV with $|v| < \Delta/4$. if $q' > 4t(1 + l_1(s))$, and $(c_0', c_1')$ is the ciphertext after switching the mdoulus to q', then $(c_0', c_1')$ also decrypts to m.

---

It should be noted that although the concept in BGV that q and t are coprime seems innocent, it affects the depth of the decryption circuit when t is large. Therefore, it results in an advantage for doing bootstrapping in FV over BGV.

Here, multiplication and division by p in plaintext space is discussed. In bootstrapping, the following functionalities are used: dividing by p, which takes an encryption of pm mod $p^e$ and returns an encryption of m mod $p^{e-1}$, and multiplying by p which is the inverse of division. In the BGV scheme, multiplication by p can be realized via a fast scalar multiplication $(c_0, c_1) \to ((pc_0) \mod q, (pc_1) \mod q)$. In the FV scheme, these operations are essentially free, because if $$c_0 + c_1 s = \lfloor \frac{q}{p^{e-1}} \rfloor m + v + q\alpha,$$

then the same ciphertext satisfies $$c_0 + c_1 s = \lfloor \frac{q}{p^e} \rfloor pm + v + v' + q\alpha$$

for some small v'. These operations are assumed to be free or low cost to perform.

Turning to the digit removal algorithm, in one scheme for digit extraction, some lifting polynomials with good properties are used. A family of "lowest digit removal" polynomials were used, which have a stronger lifting property. These lowest digit removal polynomials are combined with the lifting polynomials to construct a new digit removal algorithm.

Fix a prime p. Let z be an integer with (balanced) base-p expansion: $z = \sum_{i=0}^{e-1} z_i p^i$. For integers i, j≥0, some implementations use $z_{i,j}$ to denote any integer with first base-p digit equal to $z_i$ and the next j digits zero. In other words, some implementations have $z_{i,j} \equiv z_i \mod p^{j+1}$.

Figure 2:
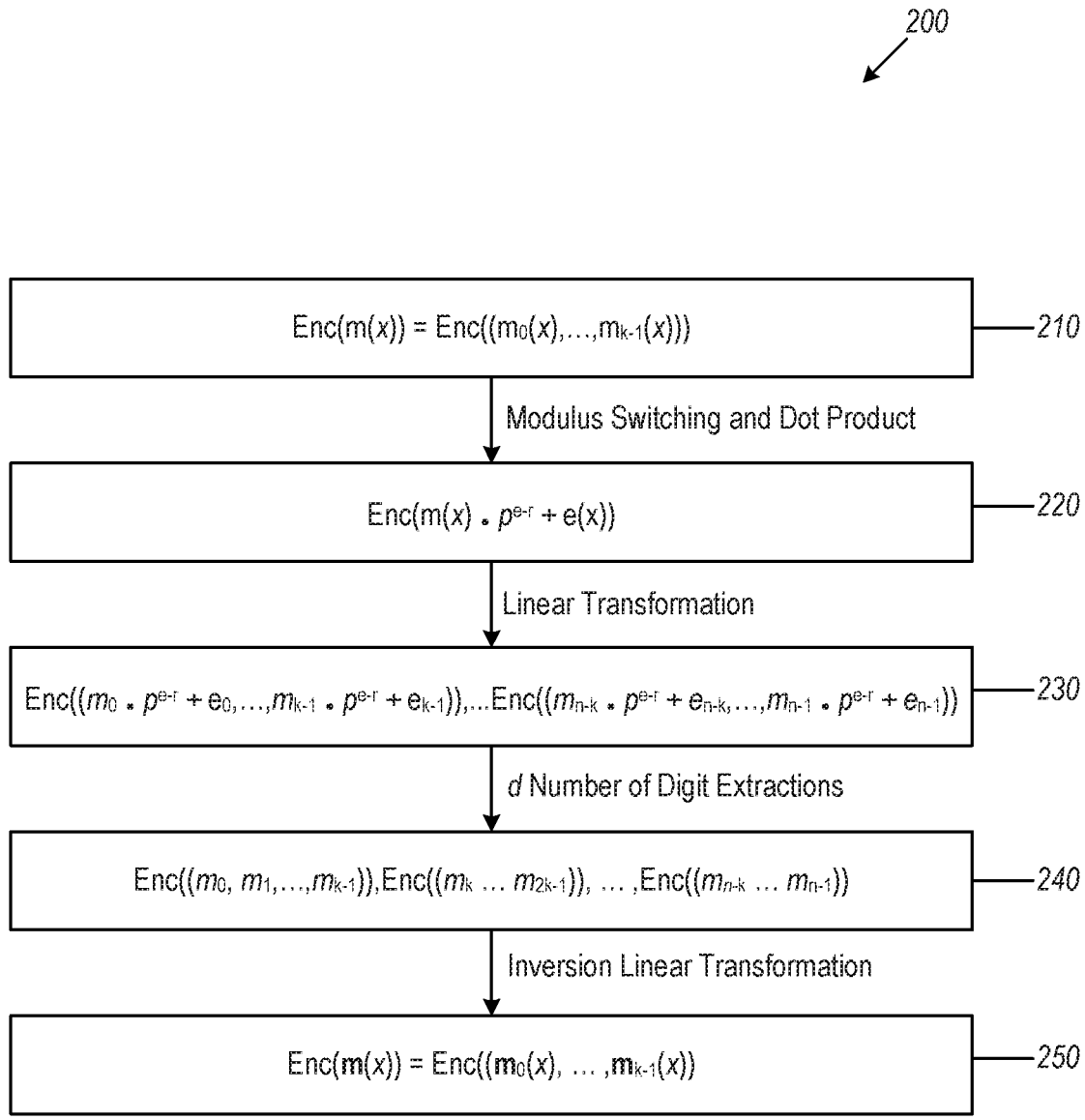
FIG. 2 illustrates a flow chart for an example regular bootstrapping method in FHE, in accordance with some embodiments.

FIG. 2 illustrates a flow chart for an example regular bootstrapping method 200 in FHE, in accordance with some embodiments. The method 200 may be implemented at the computation server 130 of FIG. 1. The method 200 may be implemented in the context of a FHE transmission between Alice 110 and Bob 120, for which calculations are done at the computation server 130. For example, Alice 110 and Bob 120 may be engaged in the sale of goods, and the computation server 130 may be used to calculate the sales tax on the sale of the goods based on encrypted numbers representing the price of the goods, the geographic location of the buyer, and/or the geographic location of the seller.

The method 200 begins at block 210 with an encoded polynomial Enc(m(x)), where m is a polynomial modulo a prime p. As shown, $Enc(m(x)) = Enc((m_0(x), \ldots, m_{k-1}(x)))$. Modulus switching and dot product are applied to block 210 to add an error term e(x), resulting in $Enc(m(x) \cdot p^{e-r} + e(x))$ at block 220. A linear transformation is applied to block 220 resulting in $Enc((m_0 \cdot p^{e-r} + e_0, \ldots, m_{k-1} \cdot p^{e-r} + e_{k-1})), \ldots Enc((m_{n-k} \cdot p^{e-r} + e_{n-k}, \ldots, m_{n-1} \cdot p^{e-r} + e_{n-1}))$ at block 230. To block 230, d number of digit extractions are applied, where d=n/k, and where n is the degree. The digit extractions remove the error term to allow for decryption. This results in $Enc((m_0, m_1, \ldots, m_{k-1})), Enc((m_k \ldots m_{2k-1})), \ldots, Enc((m_{n-k} \ldots m_{n-1}))$ at block 240. To block 240, an inverse linear transformation is applied, resulting in $Enc(m(x)) = Enc((m_0(x), \ldots, m_{k-1}(x)))$ at block 250. It should be noted that the polynomial in block 250 corresponds to that of block 210.

In some examples, as shown in FIG. 2, the bootstrapping technique includes five main operations: modulus switching, dot product (with an encrypted secret key), linear transform, digit extraction, and another "inverse" linear transform. Among these, the digit extraction operation dominates the cost, in terms of both depth and work. Hence some aspects focus on optimizing the digit extraction. Essentially, digit extraction executes the digit remove functionality.

DigitRemove(p, e, r): fix a prime p, for two integers r<e and an input u mod $p^e$, let $u = \sum u_i p^i$ with $|u_i| \leq p/2$ when p is odd (and $u_i = 0, 1$ when p=2), returns $$u \langle r, \ldots, e-1 \rangle \approx \sum_{i=r}^{e-1} u_i p^i.$$

This functionality "removes" the r lowest significant digits in base p from an e-digits integer. To realize the above functionality over homomorphically encrypted data, some aspects include some special polynomials $F_e(\bullet)$ which has the lifting property of Rule 2.

---

Rule 2 For every prime p and e ≥ 1 there exist a degree p-polynomial $F_e$ such that for every integer $z_0, z_1$ with $z_0 \in [p]$ and every $1 \leq e' \leq e$, there exists $F_e(z_0 + p^{e'} z_1) \equiv z_0 \pmod{p^{e'+1}}$.

For example, if p=2, one can take $F_e(x)=x^2$. One then uses these lifting polynomials $F_e$ to extract each digit $u_i$ from u in a successive fashion. The digit extraction procedure can be visualized in Table 1.

TABLE 1

| $u = u_{0,0}$ | $u_{0,1}$ | ... | $u_{0,r-1}$ | ... | $u_{0,e-1}$ |
|---|---|---|---|---|---|
| $u_{1,0}$ | $u_{1,1}$ | ... $u_{1,r-2}$ | ... | $u_{1,e-2}$ | |
| ⋮ | ⋮ | | ⋰ | | |
| $u_{e-2,0}$ | $u_{e-2,1}$ | | | | |
| $u_{e-1,0}$ | | | | | |

In Table 1, the top-left entry is the input. This algorithm starts with the top row. From left to right, it successively applies the lifting polynomial to obtain all the entries outside the leftmost column. Then the leftmost column entry on the next row can be obtained from subtracting all digits on the same diagonal (outside the leftmost column) from the input and then dividing by p. When this procedure concludes, the (i, j) entry of the diagram may be $u_{i,j}$. In particular, digits on the final diagonal may be $u_{i,e-1-i}$. Based on the above, the following applies:

$$u\langle r, \ldots, e-1\rangle = u - \sum_{i=0}^{r-1} u_{i,e-1-i} \cdot p^i.$$

In the technique above, it is not enough to obtain the $u_i$ mod p. Rather, one may use $u_{i,e-1-i}$. The reason is one has to clear the higher digits to create numbers with base –p expansion $$(u_i, \underbrace{0, 0, \ldots, 0}_{e-1-i}),$$

otherwise it will mess up the $u_i'$ for i'>i. Previously, to obtain $u_{i,j}, \ldots$, one may apply the lifting polynomial j times. Actually, there is a lower-degree polynomial with the same functionality.

---

Rule 3

Let p be a prime and n ≥ 1. Then there exists a polynomial f of degree at most $(e-1)(p-1)+1$ such that for every integer $0 \leq x < p^e$, there exists $f(x) \equiv x - (x \bmod p) \bmod p^e$, where $|x \bmod p| \leq (p-1)/2$ when p is odd.

Statement. f(x) has p-integral coefficients and $a(m) \binom{x}{m}$ is multiple of $p^e$ for all $x \in \mathbb{Z}$ when $m > (e-1)(p-1)+1$.

---

By the statement above, the p-adic valuation of a(m) is larger than $$\frac{m}{p-1}$$

and it is trivial that the p-adic valuation of m! is less than $$a(m)\binom{x}{m}$$

Therefore, it is proven that the coefficients of f(x) are p-integral. Indeed, it is proven that $$\frac{m}{p-1}.$$

is multiple of $p^n$ for any integer when $m>(e-1)(p-1)+1$. This means that $\hat{f}(x)=f(x) \bmod p^e$ for all $x \in \mathbb{Z}_{p^e}$.

As a result, the degree $(e-1)(p-1)+1$ polynomial f(x) satisfies the conditions in Rule 3 for the least residue system. For balanced residue system, one may just replace f(x) by f(x+p/2).

Note that the above polynomial f(x) removes the lowest base-p digit in an integer. It is also desirable sometimes to "retain" the lowest digit, while setting all the other digits to zero. This can be easily done via g(x)=x−f(x). Throughout this document, such polynomial that retains the lowest digit is denoted by $G_{n,p}(x)$ (or $G_n(x)$ if p is clear from context). In other words, if $x \in \mathbb{Z}_{p^e}$ and $x \equiv x_0 \bmod p$, with $|x_0| \leq p/2$, then $G_e(x) \equiv x_0 \bmod p^e$.

In one example, when n=2, one has $f(x)=-x (x-1) \ldots (x-p)$ and $G_2(x)=x-f(x)$.

According to the approach above, it takes degree $p^{e-i-1}$ and (e−i−1) evaluations of polynomials of degree p to obtain $u_{i,e-1}$. With the lowest digit removing polynomial, it only takes degree $(e-i-1)(p-1)+1$. Therefore, the digit removal polynomials can be used to reduce some lifting work in the approach above. As a result, by combining the lifting polynomials and lowest digit removing, the digit extraction algorithm becomes faster and has lower depth.

Table 2 illustrates how the digit removal algorithm works. First, each middle (not leftmost and not rightmost) digit is obtained by evaluating the lift polynomial to the entry on its left. Then, the rightmost digit on each row is obtained by evaluating the remaining lowest digit polynomial to the leftmost digit on its row. Finally, the leftmost digits are obtained by subtracting all the middle digits on the same diagonal from the input, and dividing by p.

TABLE 2

| $u_{0,0}$ | $u_{0,1}$ | ... | $u_{0,r-2}$ | $u_{0,r-1}$ | $u_{0,e-1}$ |
|---|---|---|---|---|---|
| $u_{1,0}$ | $u_{1,1}$ | ... | $u_{1,r-2}$ | | $u_{1,e-2}$ |
| ⋮ | | | | | |
| $u_{r-2,0}$ | $u_{r-2,1}$ | | $u_{r-2,e-r+1}$ | | |
| $u_{r-1,0}$ | | $u_{r-1,e-r}$ | | | |

Finally, in order to remove the r lowest digits, some aspects subtract from the input, all the rightmost digits obtained. One difference of this procedure is that one only has to populate the top left triangle of side length r, plus the rightmost r-by-1 diagonal, whereas the previous scheme had to populate the entire triangle of side length e.

Moreover, the rightmost digits in this technique have lower depth: in the earlier-described technique, the i-th rightmost digit is obtained by evaluating lift polynomial (e−i−1) times, hence its degree is $p^{e-i-1}$ on top of the i-th leftmost digit. However, in the technique discussed here, its degree is only $(p-1)(e-i-1)+1$ on top of the i-th green digit, which has degree at most $p^i$, the total degree of the algorithm is bounded by the maximum degree over all the rightmost digits.

$$\max_{0 \le i < r} p^i((e-1-i)(p-1)+1)$$

Since each individual term is bounded by $ep^r$, the degree is at most $ep^r$. This makes the digit extraction method lower degree, which is useful for bootstrapping in homomorphic encryption.

---

Algorithm 1: Technique for removing r lowest digits from $x \in \mathbb{Z}_{p^e}$
Data: $x \in \mathbb{Z}_{p^e}$
Result: $x - [x]_{p^r} \mod p^e$
// $F_i(x)$ : lift poly with $F_i(x + O(p^i)) = x + O(p^{i+1})$
// $G_i(x)$ : lowest digit remain poly with $G_i(x) = [x]_p \mod p^i$
Find largest l such that $p^l < (p-1)(e-1)+1$;
Initialize res = x;
for $i \in [0, r)$ do
  // r time evaluate lowest digit remain polynomial
  $R_i = G_{e-i}(x')$ ;          // $R_i = x_i \mod p^{e-i}$
  $R_i = R_i \cdot p^i$ ;           // $R_i = x_i p^i \mod p^e$
  if $i < r - 1$ then
    // (r - 1) time evaluate lift polynomial
    $L_{i,0} = F_1(x')$
  end
  for $j \in [0, l-2)$ do
    if $i + j < r - 1$ then
      $L_{i,j+1} = F_{j+2}(L_{i,j})$
    end
  end
  if $i < r - 1$ then
    $x' = x$;
    for $j \in [0; i+1)$ do
      if $i - j > l - 2$ then
        $x' = x' - R_j$
      end
      else
        $x' = x' - L_{j,i-j}$
      end
    end
  end
  res = res - $R_i$;
end

---

Some aspects provide one further optimization to remove r lowest digits in base p from an e-digit integer. If l is an integer such that $p^l > (p-1)(e-1)+1$, then instead of using lifting polynomials to obtain the l-th digit, some aspects use the result of evaluating remain polynomial (or, the red digit) to obtain the green digit in the next row. This could save some work and also lowers the depth of the overall procedure.

The depth and computation cost of Algorithm 1 is summarized in Theorem 1, below. The depth of Algorithm 1 is simply the maximum depth of all the removed digits. To determine the computational cost to evaluate Algorithm 1 homomorphically, one may to specify the unit of measurement. Since constant-ciphertext multiplication is much faster than FHE schemes than ciphertext-ciphertext multiplications, one chooses to measure by the number of multiplications. Thus, one measures the computational cost in terms of ciphertext-ciphertext multiplications.

---

Theorem 1

Algorithm 1 is correct. Its depth is bounded above by
$\log(ep^r) = \log(e) + r \log(p)$.
The number of non-constant multiplications is asymptotically equal to $$\left\{\frac{2}{3}\left(e^{\frac{3}{2}} - (e-r)^{\frac{3}{2}}\right) + (1 + \log_p(e))r\right\} \cdot \sqrt{2p} .$$

---

Some aspects provide an order of magnitude for the depth of $O(\log(e)+r \log(p))$ and an order of magnitude for the number of multiplications of $$O(r(\sqrt{e}+\log_p(e))\sqrt{p})$$

The bootstrapping for the FV scheme follows the main operations of the bootstrapping for the BGV scheme described above, while two modifications are made in modulus switching and digit extraction. For modulus switching, one fixes some $q' < q$ and one computes a new ciphertext c' which encrypts the same plaintext but has much smaller size.

For dot product with bootstrapping key, one computes homomorphically the dot product $\langle c', \tilde{s} \rangle$, where $\tilde{s}$ is an encryption of a new secret key s' under a large coefficient modulus Q and a new plaintext modulus $t'=p^{e+r}$. The result of this operation is an encryption of m+tv under the new parameters (s', t', Q).

For linear transformation, let d denote the multiplicative order of p in $\mathbb{Z}_m^*$ and k=n/d be the number of slots supported in plaintext batching. Assuming the plaintext modulus is a prime power $p^r$. Suppose the input to linear transform is an encryption of $\sum_{i=0}^{n-1} a_i x^i$, then the output of this operation is d ciphertexts $C_0, \ldots, C_d$, where $C_j$ is a batch encryption of $(a_{jk}, a_{jk+1}, \ldots, a_{jk+k-1})$.

For digit extraction, when the above operations are completed, d ciphertexts are obtained. The first ciphertext is a batch encryption of:

$$(m_0 \cdot p^{e-r}+e_0, m_1 \cdot p^{e-r}+e_1, \ldots, m_{k-1} \cdot p^{e-r}+e_{k-1})$$

Assuming that $$|e_i| \le \frac{p^{e-r}}{2}$$

for each i, Algorithm 1 may be applied to remove the lower digits $e_i$, resulting in d new ciphertexts encrypting $\Delta m_i$ for $0 \le i < n$ in the slots. Then a free division may be performed to get d ciphertexts, encrypting $m_i$ in the slots.

For inverse linear transformation, another linear transformation is applied, which combines the d ciphertexts into one single ciphertext encrypting m(x).

Suppose $t=p^r$ is a prime power, and there exists a ciphertext $(c_0, c_1)$ modulo q. Here, instead of switching to a modulus q' coprime top as done in BGV, some aspects switch to $q'=p^e$, and obtain ciphertext $(c_0', c_1')$ such that:

$$c_0'+c_1's=p^{e-r}m+v+\alpha p^e.$$

Then, one input ciphertext to the digit extraction operation may be a batch encryption:

$$Enc((p^{e-r}m_0+v_0, \ldots p^{e-r}m_k+v_k))$$

The above is under plaintext modulus $p^e$. Hence this operation may use DigitRemove(p, e, e−r), which similar to the BGV digit extraction procedure outlined above.

However, there is a crucial difference between the two schemes on the parameter e. In case of FV, by Rule 1, some aspects can select (roughly) e=r+log$_p$(l$_1$(s)). For BGV, the estimate of e for correct bootstrapping is:

$$e \geq 2r + \log_p(l_1(s)).$$

Some aspects analyze the impact of this difference on the depth of digit removal, and therefore on the depth of bootstrapping. Using the formula in Theorem 1, the depth for the BGV case is:

$$(r+\log_p(l_1(s)))\log_p + \log(2r+\log_p(l_1(s))).$$

Some aspects substitute r=log$_p$(t) into the above formula and simplify the depth for BGV bootstrapping as:

$$\log t + \log(l_1(s)) + \log(2 \log_p(t) + \log_p(l_1(s))).$$

Note that the depth grows linearly with the logarithm of the plaintext modulus t. On the other hand, the bootstrapping depth for FV case turns out to be:

$$\log(l_1(s)) + \log(\log_p(t) + \log_p(l_1(s))).$$

The depth for FV grows linearly with only log t, which is smaller than the depth for BGV in the large plaintext modulus regime.

Some aspects compare the number of ciphertext multiplications used for the digit extraction procedures. If the plaintext modulus is t=p$^r$, then in the digit extraction in bootstrapping, some aspects remove the lowest (e−r) digits from e digits. By replacing r with e−r in the second formula in Theorem 1 and throwing away insignificant terms, the work is determined by the quantity:

$$\sqrt{p} \cdot (e^{3/2} - r^{3/2}).$$

Letting e=2r+log$_p$(l$_1$(s)) (resp. e=r+log$_p$(l$_1$(s))) one sees that the work is dominated by $\sqrt{p}r^{3/2}$ for BGV (respectively: $\sqrt{p}r^{1/2} \log_p(l_1(s))$ for FV). Hence when t is large, FV may use less work than BGV for the digit extraction procedure in bootstrapping.

The improved BGV bootstrapping algorithm has a dependence of bootstrapping depth on the plaintext modulus of log t. Another advantage of the revised BGV bootstrapping is that, since the overall depth is reduced for the large plaintext modulus case, a smaller modulus q can be used, increasing the security level. At the same time, the smaller q leads to faster homomorphic operations.

The bootstrapping algorithm for FV is expensive mainly because of d repetitions of digit extraction. In many parameters, the extension degree d is large for small plaintext modulus. However, many interesting applications may use arithmetic over $\mathbb{Z}_{p^r}$ rather than the degree-d extension ring, making it hard to utilize the full plaintext space.

Figure 3:
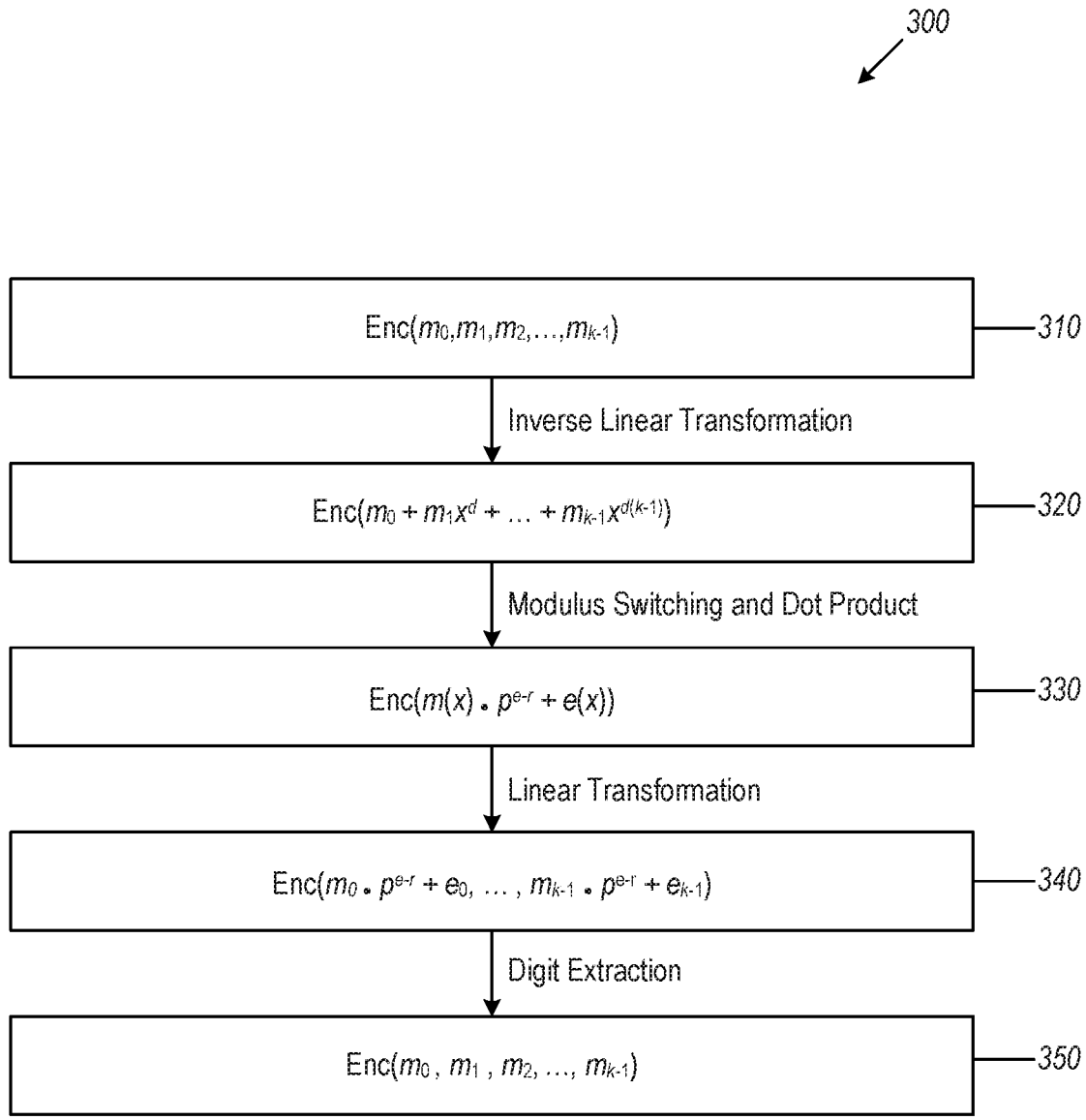
FIG. 3 illustrates a flow chart for an example slim bootstrapping method in FHE, in accordance with some embodiments.

Therefore some aspects introduce one more bootstrapping algorithm which is called "slim" bootstrapping and illustrated in FIG. 3. This bootstrapping algorithm works with the plaintext space $\mathcal{M} = \mathbb{Z}_t^n$, embedded as a subspace of R$_t$ through the batching isomorphism.

FIG. 3 illustrates a flow chart 300 for an example slim bootstrapping method in FHE, in accordance with some embodiments. The method 300 may be implemented at the computation server 130 of FIG. 1. The method 300 may be used to facilitate any transaction in which FHE may be used, such as a blockchain transaction, a cryptocurrency transaction, a purchase or sale of a good or service using government-backed currency, a purchase or sale of a security using government-backed currency, a secure voting system, a collision-resistant hash function, a private information retrieval system, and the like. In one example, the method 300 is used to convert, at the computation server 130, a purchase price agreed upon by Alice 110 and Bob 120 from United States Dollars to Euros without revealing the purchase price to the computation server 130.

At block 310, a set of encoded numbers Enc(m$_0$, m$_1$, m$_2$, . . . , m$_{k-1}$) is provided. The set of encoded numbers includes a first number, k, of numbers. The numbers are modulo a prime p. An inverse linear transformation is applied to block 310. At block 320, the set of encoded numbers is written in polynomial form as Enc(m$_0$+m$_1$x$^d$+ . . . +m$_{k-1}$x$^{d(k-1)}$), where d=n/k, and wherein n is the degree. The polynomial form includes only terms where a variable x is raised to powers of zero or multiples of the number d, where d is an integer greater than or equal to two. Modulus switching and dot product is applied to block 320. At block 330, the polynomial is converted to Enc(m (x)$^{.e-r}$+e(x)), where e(x) is an error term and e and r are integers. A linear transformation is applied to block 330. At block 340, the linear transformation results in a first batch encryption, Enc(m$_0$·p$^{e-r}$+e$_0$, . . . , m$_{k-1}$·p$^{e-r}$+e$_{k-1}$). The error term may be an error polynomial. The error polynomial may include only terms where a variable x is raised to powers of zero or multiples of the number d. Digit extraction is applied to block 340. At applied to obtain block 350. As shown, the digit extraction results in a second batch encryption, Enc (m$_0$, m$_1$, m$_2$, . . . , m$_{k-1}$). It should be noted that the numbers in block 350 corresponds to those of block 310. In some cases, only a single digit extraction (and not multiple digit extractions) is applied to the first batch encryption to obtain the second batch encryption.

The method 300 may be adapted using almost the same algorithm as the original bootstrapping algorithm, except that only one digit extraction operation might be performed. Hence, it is roughly d times faster than the regular bootstrapping algorithm illustrated in FIG. 2. Also, some aspects revise the linear transformation and inverse linear transformation to specify to this case. An outline of the slim bootstrapping algorithm is given in FIG. 3. In some cases, during execution of the method 300, the set of encoded numbers might not be decoded. The set of encoded numbers might be decoded after the method 300 is completed and at a machine different from the computation server 130. For example, the set of encoded numbers may be decoded at Alice 110 or Bob 120.

In inverse linear transformation, some aspects take as input a batch encryption of (m$_1$ . . . , m$_k$)∈$\mathbb{Z}_{p^r}$. In the first operation, some aspects apply an "inverse" linear transformation to obtain an encryption of m$_1$+m$_2$x$^d$+ . . . +m$_k$x$^{d(k-1)}$. This can be done using k slot rotations and k plaintext multiplications.

In modulus switching and dot product with bootstrapping key, the operations are exactly the same as those of the full bootstrapping procedure of FIG. 2. After these operations, some aspects obtain a (low-noise) encryption of $$(\Delta m_1+v_1+(\Delta m_2+v_2)x^d+ \ldots +(\Delta m_k+v_k)x^{d(k-1)}).$$

In linear transformation, some aspects apply another linear transformation, consisting of k slot permutations and k plain multiplications to obtain a batch encryption of (Δm$_1$+v$_1$, . . . , Δm$_k$+v$_k$).

In digit extraction, some aspects apply the digit-removal algorithm to remove the coefficients v$_i$, resulting in a batch encryption of (Δm$_1$, . . . , Δm$_k$). Some aspects then execute the free division and obtain a batch encryption of (m$_1$, . . . , m$_k$). This completes the bootstrapping process.

Some aspects of the technology described herein relate to optimizing the linear transform for slim bootstrapping. In the slim mode of bootstrapping, a linear transform is used. The linear transform has the following property: suppose the input is an encryption of $\Sigma m_i x^i$. Then the output is a batch encryption of $(m_0, m_d, \ldots, m_{d(k-1)})$. A straightforward implementation of this functionality may use n slot permutations and n plaintext multiplications. However, in the case when n is a power of 2, some aspects break down the linear transform into two parts, which are called coefficient selection and sparse linear transform. This reduces the number of slot permutations to $\log(d)+k$ and the number of plaintext multiplications to k.

Some aspects of the technology described herein relate to coefficient selection. The first part of the optimized linear transform functionality can be viewed as a coefficient selection. This process get input Enc(m(x)) and return Enc(m'(x)) with $m'(x) = \Sigma_{i=0}^{n/d} m_{id} x^{id}$. In other words, it selects the coefficients of m(x) with the exponent of x divisible by d. The following algorithm is specified to the case when n is power of two form. Using the property that $x^n = -1$ in the ring R, an automorphism $\phi_i$ of R may be constructed such that:

$$\phi_i : X^{2^i} \to X^{n+2^i} = X^{2^i}.$$

For example $\phi_0(\bullet)$ negates all odd coefficients, because $\phi_0$ maps X to $-X$. This means that $\frac{1}{2}(\phi_0(m(x)) + m(x))$ removes all odd terms and doubles the even terms. Using this property a recursive algorithm which return $m'^{(x)} = \Sigma_{i=0}^{n/d} m_{id} x^{id}$ for power of two d may be made.

For given m(x), First compute $m(x) + \phi_0(m(x)) = m_0(x)$.

Recursively compute, $m_i(x) = \phi_i(m_{i-1}(x)) + m_{i-1}(x)$ for $1 \leq i \leq \log_2 d$.

Compute $m'(x) = d^{-1} \cdot m_{\log_2 d}$ mod t for plain modulus t.
Return $m'(x) = m_{\log_2 d}(x)$.
The function $$\phi_i : X \to X^{\frac{n+2^i}{2^i}}$$

can be evaluated homomorphically by using key switching technique. Another operation is just multiply $d^{-1}$ mod t, so one can homomorphically obtain Enc(m'(x)). This process uses log d slot rotations and additions.

Some aspects of the technology described herein relate to a sparse linear transform. The desired functionality of the sparse linear transform is: take as input an encryption c of $\Sigma m_i x^{id}$ and output a batch encryption of $(m_0, m_1, \ldots, m_{k-1})$. This functionality may be expressed as $\Sigma_{i=0}^{k-1} \lambda_i \sigma_{s_i}(c)$, where $\lambda_i \in R_t$ and the $s_i$ form a set of representatives of $\mathbb{Z}_m^* / \langle p \rangle$. This is because the input plaintext only has k nonzero coefficients $m_0, \ldots, m_{k-1}$. Hence for each i it is possible to write $m_i$ as a linear combination of the evaluations of the input at k different roots of unities. Therefore, this operation may use k slot rotations and k plaintext multiplications. The number of rotations can be reduced to $O(\sqrt{k})$.

Some aspects of the technology described herein relate to memory usage. Some aspects pre-compute some data which are used in the linear transforms. The major part of the memory consumption includes slot-permutation keys and plaintext polynomials. More precisely, each plaintext polynomial has size n log t bits. The size of one slot-permutation key may be $$(2n \log q) \cdot \left\lfloor \frac{\log q}{62} \right\rfloor.$$

Some aspects report the number of such keys and plaintext polynomials used in the bootstrapping. In the regular mode, some aspects use $2\sqrt{n}$ slot-permutation keys, and $2\sqrt{n}+d+k$ plaintext polynomials.

On the other hand, the slim mode of bootstrapping may use considerably less memory. Both inverse linear transform and the linear transform can be implemented, each using only $2\sqrt{k}$ slot-permutation keys and k plaintext polynomials.

In some examples, the inverse linear transformation comprises k slot rotations and k plaintext multiplications. In some examples, the linear transformation comprises k slot rotations and k plaintext multiplications. In some examples, the digit extraction comprises a digit removal algorithm that removes r lowest base p digits from integers modulo $p^e$. In some examples, n is a power of 2, such as 2, 4, 8, 16, 32, etc. In some examples, the error term $e(x) = e_0 + e_1 x^d + e_2 x^{2d} + \ldots + e_{k-1} x^{d(k-1)}$. In some examples, d is a multiplicative order of p in a plaintext space $\mathbb{Z}_m^*$.

NUMBERED EXAMPLES

Certain embodiments are described herein as numbered examples 1, 2, 3, etc. These numbered examples are provided as examples only and do not limit the subject technology.

Example 1 is a method comprising: accessing a set of encoded digits, the set of encoded digits including a first number of digits; applying an inverse linear transformation to the set of encoded digits to obtain a first encoded polynomial, the first encoded polynomial including only terms where a variable x is raised to powers of zero or multiples of a second number, the second number being an integer greater than or equal to two; applying a modulus switching and dot product with bootstrapping key to add an error term to each of the encoded digits in the first polynomial to obtain a second encoded polynomial; applying a linear transformation to the second encoded polynomial to obtain a first batch encryption; and applying digit extraction to the first batch encryption to obtain a second batch encryption, the second batch encryption corresponding to the set of encoded digits without the error term.

In Example 2, the subject matter of Example 1 includes, wherein the inverse linear transformation comprises the first number of slot rotations and the first number of plaintext multiplications.

In Example 3, the subject matter of Examples 1-2 includes, wherein the linear transformation comprises the first number of slot rotations and the first number of plaintext multiplications.

In Example 4, the subject matter of Examples 1-3 includes, wherein the digit extraction comprises a digit removal algorithm.

In Example 5, the subject matter of Examples 1-4 includes, foregoing decoding the set of encoded digits.

In Example 6, the subject matter of Examples 1-5 includes, wherein the error term corresponds to an error polynomial, the error polynomial including only terms where the variable x is raised to powers of zero or multiples of the second number.

In Example 7, the subject matter of Examples 1-6 includes, wherein applying the digit extraction to the first batch encryption to obtain the second batch encryption comprises applying exactly a single digit extraction, and not multiple digit extractions, to the first batch encryption.

Example 8 is a system comprising: processing hardware; and a memory storing instructions which, when executed by the processing hardware, cause the processing hardware to perform operations comprising: accessing a set of encoded digits, the set of encoded digits including a first number of digits; applying an inverse linear transformation to the set of encoded digits to obtain a first encoded polynomial, the first encoded polynomial including only terms where a variable x is raised to powers of zero or multiples of a second number, the second number being an integer greater than or equal to two; applying a modulus switching and dot product with bootstrapping key to add an error term to each of the encoded digits in the first polynomial to obtain a second encoded polynomial; applying a linear transformation to the second encoded polynomial to obtain a first batch encryption; and applying digit extraction to the first batch encryption to obtain a second batch encryption, the second batch encryption corresponding to the set of encoded digits without the error term.

In Example 9, the subject matter of Example 8 includes, wherein the inverse linear transformation comprises the first number of slot rotations and the first number of plaintext multiplications.

In Example 10, the subject matter of Examples 8-9 includes, wherein the linear transformation comprises the first number of slot rotations and the first number of plaintext multiplications.

In Example 11, the subject matter of Examples 8-10 includes, wherein the digit extraction comprises a digit removal algorithm.

In Example 12, the subject matter of Examples 8-11 includes, the operations further comprising: foregoing decoding the set of encoded digits.

In Example 13, the subject matter of Examples 8-12 includes, wherein the error term corresponds to an error polynomial, the error polynomial including only terms where the variable x is raised to powers of zero or multiples of the second number.

In Example 14, the subject matter of Examples 8-13 includes, wherein applying the digit extraction to the first batch encryption to obtain the second batch encryption comprises applying exactly a single digit extraction, and not multiple digit extractions, to the first batch encryption.

Example 15 is a non-transitory machine-readable medium storing instructions which, when executed by one or more machines, cause the one or more machines to perform operations comprising: accessing a set of encoded digits, the set of encoded digits including a first number of digits; applying an inverse linear transformation to the set of encoded digits to obtain a first encoded polynomial, the first encoded polynomial including only terms where a variable x is raised to powers of zero or multiples of a second number, the second number being an integer greater than or equal to two; applying a modulus switching and dot product with bootstrapping key to add an error term to each of the encoded digits in the first polynomial to obtain a second encoded polynomial; applying a linear transformation to the second encoded polynomial to obtain a first batch encryption; and applying digit extraction to the first batch encryption to obtain a second batch encryption, the second batch encryption corresponding to the set of encoded digits without the error term.

In Example 16, the subject matter of Example 15 includes, wherein the inverse linear transformation comprises the first number of slot rotations and the first number of plaintext multiplications.

In Example 17, the subject matter of Examples 15-16 includes, wherein the linear transformation comprises the first number of slot rotations and the first number of plaintext multiplications.

In Example 18, the subject matter of Examples 15-17 includes, wherein the digit extraction comprises a digit removal algorithm.

In Example 19, the subject matter of Examples 15-18 includes, the operations further comprising: foregoing decoding the set of encoded digits.

In Example 20, the subject matter of Examples 15-19 includes, wherein the error term corresponds to an error polynomial, the error polynomial including only terms where the variable x is raised to powers of zero or multiples of the second number.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Example A1 is a method comprising: accessing a set of k encoded digits Enc $<m_0, m_1, m_2, \ldots, m_{k-1}>$ modulo a prime p; applying an inverse linear transformation to the set of encoded digits to obtain a first encoded polynomial Enc $<m(x)>$=Enc $<m_0+m_1x^d+m_2x^{2d}+ \ldots +m_{k-1}x^{d(k-1)}>$, wherein d=n/k, and wherein n is the degree; applying a modulus switching and dot product with bootstrapping key to add an error term e(x) to each of the k encoded digits in the first polynomial to obtain a second encoded polynomial Enc $<m(x)*p^{e-r}+e(x)>$, wherein e and r are integers; applying a linear transformation to the second encoded polynomial to obtain a first batch encryption Enc $<(m_0*p^{e-r}+e_0), (m_1*p^{e-r}+e_1), (m_2*p^{e-r}+e_2), \ldots, (m_{k-1}*p^{e-r}+e_{k-1})>$; and applying digit extraction to the first batch encryption to obtain a second batch encryption Enc $<m_0, m_1, m_2, \ldots, m_{k-1}>$, the second batch encryption corresponding to the set of k encoded digits without the error term.

Example A2 is the method of Example A1, wherein the inverse linear transformation comprises k slot rotations and k plaintext multiplications.

Example A3 is the method of Example A1, wherein the linear transformation comprises k slot rotations and k plaintext multiplications.

Example A4 is the method of Example A1, wherein the digit extraction comprises a digit removal algorithm that removes r lowest base p digits from integers modulo $p^e$.

Example A5 is the method of Example A1, wherein n is a power of 2.

Example A6 is the method of Example A1, wherein the error term $e(x)=e_0+e_1x^d+e_2x^{2d}+ \ldots +e_{k-1}x^{d(k-1)}$.

Example A7 is the method of Example A1, wherein d is a multiplicative order of p in a plaintext space $\mathbb{Z}*_m$.

Example A8 is a system comprising: processing hardware; and a memory storing instructions which, when executed by the processing hardware, cause the processing hardware to perform operations comprising: accessing a set of k encoded digits Enc $<m_0, m_1, m_2, \ldots, m_{k-1}>$ modulo a prime p; applying an inverse linear transformation to the set of encoded digits to obtain a first encoded polynomial Enc $<m(x)>$=Enc $<m_0+m_1x^d+m_2x^{2d}+ \ldots +m_{k-1}x^{d(k-1)}>$, wherein d=n/k, and wherein n is the degree; applying a modulus switching and dot product with bootstrapping key to add an error term e(x) to each of the k encoded digits in the first polynomial to obtain a second encoded polynomial Enc $<m(x)*p^{e-r}+e(x)>$, wherein e and r are integers; applying a linear transformation to the second encoded polynomial to obtain a first batch encryption Enc $<(m_0*p^{e-r}+e_0)$, $(m_1*p^{e-r}+e_1)$, $(m_2*p^{e-r}+e_2)$, ..., $(m_{k-1}*p^{e-r}+e_{k-1})>$; and applying digit extraction to the first batch encryption to obtain a second batch encryption Enc $<m_0, m_1, m_2, \ldots, m_{k-1}>$, the second batch encryption corresponding to the set of k encoded digits without the error term.

Example A9 is the system of Example A8, wherein the inverse linear transformation comprises k slot rotations and k plaintext multiplications.

Example A10 is the system of Example A8, wherein the linear transformation comprises k slot rotations and k plaintext multiplications.

Example A11 is the system of Example A8, wherein the digit extraction comprises a digit removal algorithm that removes r lowest base p digits from integers modulo $p^e$.

Example A12 is the system of Example A8, wherein n is a power of 2.

Example A13 is the system of Example A8, wherein the error term $e(x)=e_0+e_1x^d+e_2x^{2d}+\ldots e_{k-1}x^{d(k-1)}$.

Example A14 is a machine-readable medium storing instructions which, when executed by one or more machines, cause the one or more machines to perform operations comprising: accessing a set of k encoded digits Enc $<m_0, m_1, m_2, \ldots, m_{k-1}>$ modulo a prime p; applying an inverse linear transformation to the set of encoded digits to obtain a first encoded polynomial Enc $<m(x)>=$Enc $<m_0+m_1x^d+m_2x^{2d}+\ldots+m_{k-1}x^{d(k-1)}>$, wherein d=n/k, and wherein n is the degree; applying a modulus switching and dot product with bootstrapping key to add an error term $e(x)$ to each of the k encoded digits in the first polynomial to obtain a second encoded polynomial Enc $<m(x)*p^{e-r}+e(x)>$, wherein e and r are integers; applying a linear transformation to the second encoded polynomial to obtain a first batch encryption Enc $<(m_0*p^{e-r}+e_0)$, $(m_1*p^{e-r}+e_1)$, $(m_2*p^{e-r}+e_2)$, ..., $(m_{k-1}*p^{e-r}+e_{k-1})>$; and applying digit extraction to the first batch encryption to obtain a second batch encryption Enc $<m_0, m_1, m_2, \ldots, m_{k-1}>$, the second batch encryption corresponding to the set of k encoded digits without the error term.

Example A15 is the machine-readable medium of Example A14, wherein the inverse linear transformation comprises k slot rotations and k plaintext multiplications.

Example A16 is the machine-readable medium of Example A14, wherein the linear transformation comprises k slot rotations and k plaintext multiplications.

Example A17 is the machine-readable medium of Example A14, wherein the digit extraction comprises a digit removal algorithm that removes r lowest base p digits from integers modulo $p^e$.

Example A18 is the machine-readable medium of Example A14, wherein n is a power of 2.

Example A19 is the machine-readable medium of Example A14, wherein the error term $e(x)=e_0+e_1x^r+e_2x^{2d}+\ldots e_{k-1}x^{d(k-1)}$.

Example A20 is the machine-readable medium of Example A14, wherein d is a multiplicative order of p in a plaintext space $\mathbf{Z}*_m$.

Example A21 is at least one machine-readable medium including instructions that, when executed by processing circuitry, cause the processing circuitry to perform operations to implement of any of Examples A1-A20.

Example A22 is an apparatus comprising means to implement of any of Examples A1-A20.

Example A23 is a system to implement of any of Examples A1-A20.

Example A24 is a method to implement of any of Examples A1-A20.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components might not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1-3 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. The instructions 416 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory/storage 430, and I/O components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiples cores, or any combination thereof.

The memory/storage 430 may include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 may also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of the processors 410 are examples of machine-readable media.

As used herein, "machine-readable medium" means a device able to store instructions (e.g., instructions 416) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine (e.g., processors 410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or other suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a USB).

Moreover, the communication components 464 may detect identifiers or include components operable to detect identifiers. For example, the communication components 464 may include Radio Frequency Identification (RFID) tag reader components, NFC smart tag detection components, optical reader components, or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

In various example embodiments, one or more portions of the network 480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 4G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The term "transmission medium" shall be taken to include any intangible medium that is capable of storing, encoding, or carrying the instructions 416 for execution by the machine 400, and includes digital or analog communications signals or other intangible media to facilitate communication of such software.

What is claimed is:

1. A computer-implemented method for data security and accuracy using fully homomorphic encryption, the method comprising:
    accessing, at processing hardware of one or more computers, a set of encoded digits, the set of encoded digits including a first number of digits;
    applying, at the processing hardware, an inverse linear transformation to the set of encoded digits to obtain a first encoded polynomial, the first encoded polynomial including only terms where a variable x is raised to powers of zero and integer multiples of a second number, the second number being an integer greater than or equal to two;
    applying, at the processing hardware, a modulus switching and dot product with bootstrapping key to add an error term to each of the encoded digits in the first polynomial to obtain a second encoded polynomial;
    applying, at the processing hardware, a linear transformation to the second encoded polynomial to obtain a first batch encryption;
    applying, at the processing hardware, digit extraction to the first batch encryption to obtain a second batch encryption, the digit extraction including successive application of a lifting polynomial to respective terms of the first batch encryption and application of a lowest digit extraction polynomial to remove the error term from the first polynomial;
    performing a homomorphic encryption operation using the second batch encryption; and
    providing a result of the homomorphic encryption operation to a component over a communication channel.

2. The method of claim 1, wherein the inverse linear transformation comprises the first number of slot rotations and the first number of plaintext multiplications and provides only a constant part of a finite ring extension that includes integers modulo a same prime power.

3. The method of claim 1, wherein the linear transformation comprises the first number of slot rotations and the first number of plaintext multiplications.

4. The method of claim 1, wherein the digit extraction comprises a digit removal algorithm.

5. The method of claim 1, further comprising:
    foregoing decoding the set of encoded digits.

6. The method of claim 1, wherein the error term corresponds to an error polynomial, the error polynomial including only terms where the variable x is raised to powers of zero or multiples of the second number.

7. The method of claim 1, wherein applying the digit extraction to the first batch encryption to obtain the second batch encryption comprises applying exactly a single digit extraction, and not multiple digit extractions, to the first batch encryption.

8. A system for data security and accuracy using fully homomorphic encryption, the system comprising:
    processing hardware; and
    a memory storing instructions which, when executed by the processing hardware, cause the processing hardware to perform operations comprising:
        accessing a set of encoded digits, the set of encoded digits including a first number of digits;
        applying an inverse linear transformation to the set of encoded digits to obtain a first encoded polynomial, the first encoded polynomial including only terms where a variable x is raised to powers of zero and integer multiples of a second number, the second number being an integer greater than or equal to two;
        applying a modulus switching and dot product with bootstrapping key to add an error term to each of the encoded digits in the first polynomial to obtain a second encoded polynomial;
        applying a linear transformation to the second encoded polynomial to obtain a first batch encryption; and
        applying digit extraction to the first batch encryption to obtain a second batch encryption, the digit extraction including successive application of a lifting polynomial to respective terms of the first batch encryption and application of a lowest digit extraction polynomial to remove the error term from the first polynomial;
        performing a homomorphic encryption operation using the second batch encryption; and
        providing a result of the homomorphic encryption operation to a component over a communication channel.

9. The system of claim 8, wherein the inverse linear transformation comprises the first number of slot rotations and the first number of plaintext multiplications.

10. The system of claim 8, wherein the linear transformation comprises the first number of slot rotations and the first number of plaintext multiplications.

11. The system of claim 8, wherein the digit extraction comprises a digit removal algorithm.

12. The system of claim 8, the operations further comprising:
    foregoing decoding the set of encoded digits.

13. The system of claim 8, wherein the error term corresponds to an error polynomial, the error polynomial including only terms where the variable x is raised to powers of zero or multiples of the second number.

14. The system of claim 8, wherein applying the digit extraction to the first batch encryption to obtain the second batch encryption comprises applying exactly a single digit extraction, and not multiple digit extractions, to the first batch encryption.

15. A non-transitory machine-readable medium storing instructions for data security and accuracy using fully homomorphic encryption, the instructions, when executed by one or more machines, causing the one or more machines to perform operations comprising:

accessing a set of encoded digits, the set of encoded digits including a first number of digits;

applying an inverse linear transformation to the set of encoded digits to obtain a first encoded polynomial, the first encoded polynomial including only terms where a variable x is raised to powers of zero and integer multiples of a second number, the second number being an integer greater than or equal to two;

applying a modulus switching and dot product with bootstrapping key to add an error term to each of the encoded digits in the first polynomial to obtain a second encoded polynomial;

applying a linear transformation to the second encoded polynomial to obtain a first batch encryption; and applying digit extraction to the first batch encryption to obtain a second batch encryption, the digit extraction including successive application of a lifting polynomial to respective terms of the first batch encryption and application of a lowest digit extraction polynomial to remove the error term from the first polynomial;

performing a homomorphic encryption operation using the second batch encryption; and providing a result of the homomorphic encryption operation to a component over a communication channel.

16. The machine-readable medium of claim 15, wherein the inverse linear transformation comprises the first number of slot rotations and the first number of plaintext multiplications.

17. The machine-readable medium of claim 15, wherein the linear transformation comprises the first number of slot rotations and the first number of plaintext multiplications.

18. The machine-readable medium of claim 15, wherein the digit extraction comprises a digit removal algorithm.

19. The machine-readable medium of claim 15, the operations further comprising: foregoing decoding the set of encoded digits.

20. The machine-readable medium of claim 15, wherein the error term corresponds to an error polynomial, the error polynomial including only terms where the variable x is raised to powers of zero or multiples of the second number.

* * * * *